US009800286B2

(12) United States Patent
Notargiacomo

(10) Patent No.: US 9,800,286 B2
(45) Date of Patent: Oct. 24, 2017

(54) APPLIANCE FOR THE SWITCHING OF RADIOFREQUENCY SIGNALS

(71) Applicant: TEKO TELECOM S.R.L., Castel San Pietro Terme (IT)

(72) Inventor: Massimo Notargiacomo, Castel San Pietro Terme (IT)

(73) Assignee: Teko Telecom S.r.l., Castel San Peitro Terme (IT)

( * ) Notice: Subject to any disclaimer, the term of this patent is extended or adjusted under 35 U.S.C. 154(b) by 0 days.

(21) Appl. No.: 14/910,916

(22) PCT Filed: Aug. 5, 2014

(86) PCT No.: PCT/IB2014/063697
§ 371 (c)(1),
(2) Date: Feb. 8, 2016

(87) PCT Pub. No.: WO2015/019278
PCT Pub. Date: Feb. 12, 2015

(65) Prior Publication Data
US 2016/0197645 A1    Jul. 7, 2016

(30) Foreign Application Priority Data

Aug. 8, 2013   (IT) .............................. MO2013A0236

(51) Int. Cl.
*H04B 1/44*    (2006.01)
*H04B 17/00*   (2015.01)
(Continued)

(52) U.S. Cl.
CPC ........... *H04B 1/44* (2013.01); *H04B 17/0085* (2013.01); *H04B 17/16* (2015.01); *H04B 17/18* (2015.01)

(58) Field of Classification Search
CPC ........... H04L 12/2825; H04L 2012/285; H04L 45/28; H04L 2209/80; H04L 2012/2841;
(Continued)

(56) References Cited

U.S. PATENT DOCUMENTS 6,308,065 B1   10/2001 Molinari et al.
6,965,241 B1 * 11/2005 Liu ..................... G01R 27/28
                                                    324/601

(Continued)

FOREIGN PATENT DOCUMENTS

GB          2277234 A   10/1994

OTHER PUBLICATIONS

European Search Report dated Nov. 18, 2013 from Italian Patent Application No. MO20130236 filed Aug. 8, 2013.
International Search Report dated Sep. 15, 2014 from International Patent Application No. PCT/IB2014/063697 filed Aug. 5, 2014.

Primary Examiner — Andrew Wendell
Assistant Examiner — Maryam Soltanzadeh
(74) Attorney, Agent, or Firm — Sunstone IP

(57) ABSTRACT

The appliance for the switching of radiofrequency signals comprises a first port and a second port connectable along a transmission/receiving line of a radiofrequency communication system, a third port connectable to a monitoring appliance of radiofrequency signals and at least a switching circuit which is able to switch between:
  a monitoring configuration, wherein the first port and the second port are connected together for the transmission/receiving of signals along the transmission/receiving line and wherein the signals are in part taken and sent to the third port for the analysis by means of the monitoring appliance;

(Continued)

a test configuration, wherein the third port and the second port are connected together for sending at least a predefined test signal from the monitoring appliance to the transmission/receiving line.

9 Claims, 4 Drawing Sheets

(51) Int. Cl.
  *H04B 17/18* (2015.01)
  *H04B 17/16* (2015.01)
(58) Field of Classification Search
  CPC  H04B 1/3883; H04B 1/16071; H04B 5/0037; H04B 7/0426; H04B 10/807; H04B 1/44; H04B 17/16; H04B 17/18; H04B 17/0085; H04W 4/008; H04W 52/0261; H04W 52/0277; H04W 52/0296
  See application file for complete search history.

(56) References Cited

U.S. PATENT DOCUMENTS

| | | | |
|---|---|---|---|
| 2004/0133750 A1* | 7/2004 | Stewart | G06F 7/575 711/148 |
| 2005/0137814 A1* | 6/2005 | Kelly | G01R 29/26 702/69 |
| 2006/0250197 A1* | 11/2006 | Petrovic | H01P 1/15 333/101 |
| 2009/0167336 A1* | 7/2009 | La Rosa | G01R 31/2858 324/750.3 |
| 2009/0312972 A1* | 12/2009 | Muller | G01R 31/31709 702/82 |
| 2013/0049786 A1* | 2/2013 | El-Hassan | H04B 17/0085 324/756.01 |
| 2013/0149972 A1* | 6/2013 | Luong | H04W 24/06 455/67.14 |

* cited by examiner

APPLIANCE FOR THE SWITCHING OF RADIOFREQUENCY SIGNALS

The present invention relates to an appliance for the switching of radiofrequency signals.

Referring to the field of mobile wireless communication, it is known that the continuous process of standardisation, along with the continuous introduction of new technologies, make the effective monitoring of the performances of communication systems used increasingly necessary and critical.

Specifically, the performances of the whole system must be monitored, both in Down-Link (DL) and in Up-Link (UL), by analysing the spectrum of radiofrequency signals transmitted and received.

In particular, the monitoring of communication systems with two specific functions is known:
the monitoring of radiofrequency signals in Down-Link (DL) and/or in Up-Link (UL);
the issue of a test radiofrequency signal (e.g. in Down-Link) and the analysis of the corresponding radiofrequency signal received (e.g. in Up-Link).

To perform these functions, the use of specific appliances connectable to a conventional transmission/receiving line of a wireless communication system is known.

In particular, these appliances are able to analyse the signals along the transmission/receiving line and are also able to inject an appropriate, predefined test signal in order to check the presence of any limits or problems in the communication system.

The known solutions have however a number of drawbacks.

In particular, the connection of the monitoring appliances to the wireless communication systems requires the use of a considerably high number of cables, both for monitoring the transmitted/received signals and for sending the test signals.

This is not only burdensome in terms of the cables used, and therefore the overall cost, but also greatly complicates the installation and maintenance procedures, greatly lengthening the time taken to perform each intervention on the system.

The main aim of the present invention is to devise an appliance for the switching of radiofrequency signals that allows to simplify the installation procedures of the known monitoring appliances on wireless communication systems.

Another object of the present invention is to devise an appliance for the switching of radiofrequency signals that allows to reduce the overall cost of installation, maintenance and use of the known monitoring appliances.

Another object of the present invention is to devise an appliance for the switching of radiofrequency signals that allows to overcome the above mentioned drawbacks of the prior art in the ambit of a simple, rational, easy and effective to use as well as low cost solution.

The above mentioned objects are achieved by the present appliance for the switching of radiofrequency signals according to claim 1.

Other characteristics and advantages of the present invention will become more evident from the description of three preferred, but not exclusive, embodiments of an appliance for the switching of radiofrequency signals, illustrated by way of an indicative, but not limitative, example in the accompanying drawings in which.

With particular reference to these figures, A globally indicates an appliance usable in wireless communication systems of known type for the switching of radiofrequency signals.

In particular, in FIGS. 1 to 6 D indicates a switching device of the appliance A, connectable to a monitoring appliance M of known radiofrequency signal and usable in particular, to allow the automatic switching from a detection and monitoring phase of a radiofrequency signal, e.g. coming from the path in Down-Link, to an injection phase of a test radiofrequency signal, and vice versa.

Advantageously, the device D is connectable to a known external monitoring apparatus and is able to detect the voltage variations on one of its inputs, in order to pilot its internal circuit to function as a signal injector or a signal detector.

Therefore, the device D according to the invention consists of a device with three RF ports which allows the automatic switching between two different functions used to monitor radiofrequency signals:
a first function of monitoring an input signal by means of a suitable coupled port;
a second function of injecting radiofrequency signals on a wireless system connected in cascade.

In particular, the device D for the switching of radiofrequency signals comprises a first port P1 and a second port P2 connectable along a transmission/receiving line T/R of a radiofrequency communication system.

The device D also comprises a third port P3 connectable to a monitoring appliance M able to analyse the signals present along the transmission/receiving line T/R of the radiofrequency communication system and also able to inject a suitable, predefined test signal, in order to check the presence of any limits or problems in the system itself.

Advantageously, the device D comprises a switching circuit S able to switch between:
a monitoring configuration, wherein the first port P1 and the second port P2 are connected together for the transmission/receiving of signals along the transmission/receiving line T/R and wherein the signals are in part taken and sent to the third port for the analysis by means of the monitoring appliance M;
a test configuration, wherein the third port P3 and the second port P2 are connected together for sending a predefined test signal from the monitoring appliance M to the transmission/receiving line T/R.

Furthermore, the device D comprises a piloting circuit P connected to the third port P3, operatively connected to the switching circuit S and able to pilot the switching circuit S between the monitoring configuration and the test configuration depending on the voltage value measured on the third port P3.

Described for illustrative purposes but not limited thereto, the figures show three possible and preferred embodiments of the device D.

Figure 1:
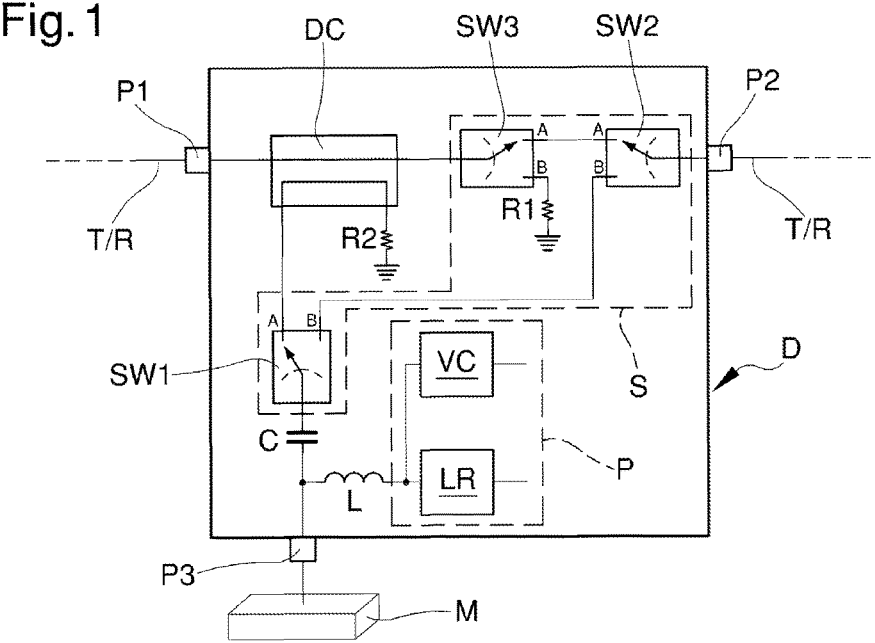
FIG. 1 is a diagram illustrating a first embodiment of a device of the appliance according to the invention in a monitoring configuration.
Figure 2:
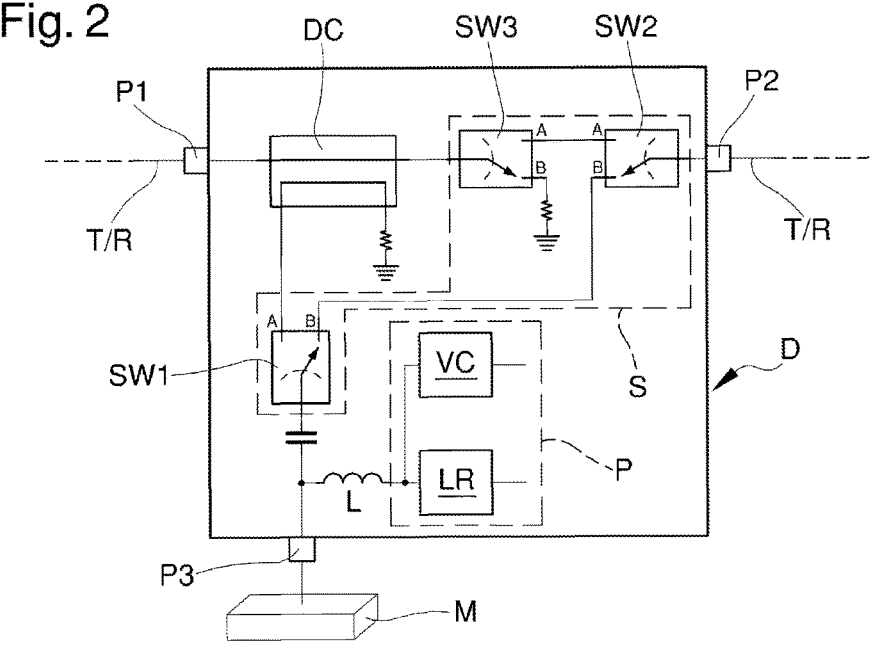
FIG. 2 is a diagram illustrating a first embodiment of the device of the appliance according to the invention in a test configuration.

In particular, FIGS. 1 and 2 show a first embodiment of the device D.

In such first embodiment the device D comprises at least a signal coupling device DC, placed between the first port P1 and the second port P2 and connected to the third port P3.

In particular, the coupling device DC is composed of a directional coupler able to take part of the radiofrequency signals entering the port P1 and to send them to the third port P3, for the analysis by means of the monitoring appliance M.

Preferably, the coupling device DC is made up of a 30 dB directional coupler.

Advantageously, the switching circuit S comprises a first switching device SW1 connected to the third port P3.

In the monitoring configuration, the first switching device SW1 is switched to a first position, indicated by reference A in the figures, and is connected to the directional coupler DC.

In the test configuration, the first switching device SW1 is switched to a second position, indicated by reference B in the figures, and is connected to a second switching device SW2 of the switching circuit S, in turn connected to the second port P2.

In the monitoring configuration, the second switching device SW2 is switched to a first position A and is connected to a third switching device SW3 of the switching circuit S, in turn connected to the directional coupler DC.

In the test configuration, the second switching device SW2 is switched to a second position B and is connected to the first switching device SW1.

Furthermore, in the monitoring configuration, the third switching device SW3 is switched to a first position A and is connected to the second switching device SW2.

In the test configuration, the third switching device SW3 is switched to a second position B and is connected to a load resistor R1.

Usefully, the presence of the resistor R1, preferably equal to 50 ohm, on port B of the third switching device SW3 allows to terminate the transmission line connected to port P1 minimising the Voltage Standing Wave Ratio VSWR when the second and third switching device SW2 and SW3 are in the test configuration (position B).

Advantageously, again referring to the first embodiment of the device D illustrated in FIGS. 1 and 2, the first, second and third switching devices SW1, SW2 and SW3 are respectively composed of a first, second and third RF switch. The use of RF switches particularly allows for the miniaturisation of the device D.

To avoid the use of direct power lines, the present invention provides direct current power supply through the same RF cable connected to the third port P3.

In particular, the appliance M itself may, using a bias-tee, inject both the direct current power and the RF signal (when using the device in test configuration) on the same cable connected to the third port P3.

Therefore, inside the cable connected to the port P3 are carried both the RF signals which can be switched in receipt and transmission within the appliance M, and the direct current power and control voltage again injected by the appliance M.

Moreover, the piloting circuit P of the device D comprises a voltage comparator VC with an input connected to the third port P3 and an output connected to the first, second and third switches SW1, SW2 and SW3, which is able to pilot its switching between the monitoring configuration and the test configuration.

In particular, the voltage comparator VC is able to compare the voltage value measured on the third port P3 with predefined threshold values Vx and Vy, where Vy=Vx+Vz, to pilot the switching of the switches.

The device D also comprises a voltage regulator LR connected to the third port P3 and used to convert the input direct voltage to a constant voltage preferably of 2.5 V, in order to ensure the correct power supply to the switches SW1, SW2 and SW3.

The device D also comprises a capacitor C placed between the third port P3 and the first switch SW1 and presents an inductance L between the third port P3 and the piloting circuit P to decouple the direct current power from the radiofrequency signal.

Finally, the device D comprises a further load resistor R2 connected to one of the ports of the coupling device DC used to appropriately terminate the latter.

The operation of the device D according to the first embodiment illustrated in FIGS. 1 and 2 is described below.

When the voltage comparator VC detects an input voltage on the third port P3 substantially equal to a predefined reference voltage Vx, then the first, second and third switches SW1, SW2 and SW3 are piloted in the monitoring configuration (position A, illustrated in FIG. 1).

In this configuration the device D works as a coupler.

In practice (referring e.g. to the Down-Link of radiofrequency signals) the signal on the first port P1 follows the path to the second port P2, while a small part of the signal is taken by the directional coupler DC and sent to third port P3.

The signal taken this way can therefore be monitored and analysed by the monitoring appliance M connected to the third port P3.

When, on the other hand, the voltage comparator VC detects an input voltage on the third port P3 substantially equal to a predefined reference voltage Vy, where Vy=Vx+Vz, then the first, second and third switches SW1, SW2 and SW3 are piloted in the test configuration (position B, illustrated in FIG. 2).

In this configuration the device D works as a signal injector.

In practice the test signal from the monitoring appliance M through the third port P3 follows the path to the second port P2. This test signal is therefore transmitted by means of the external wireless communication system and is used to check the performance of the system itself in terms of the spectrum of the corresponding radiofrequency signal received.

Figure 3:
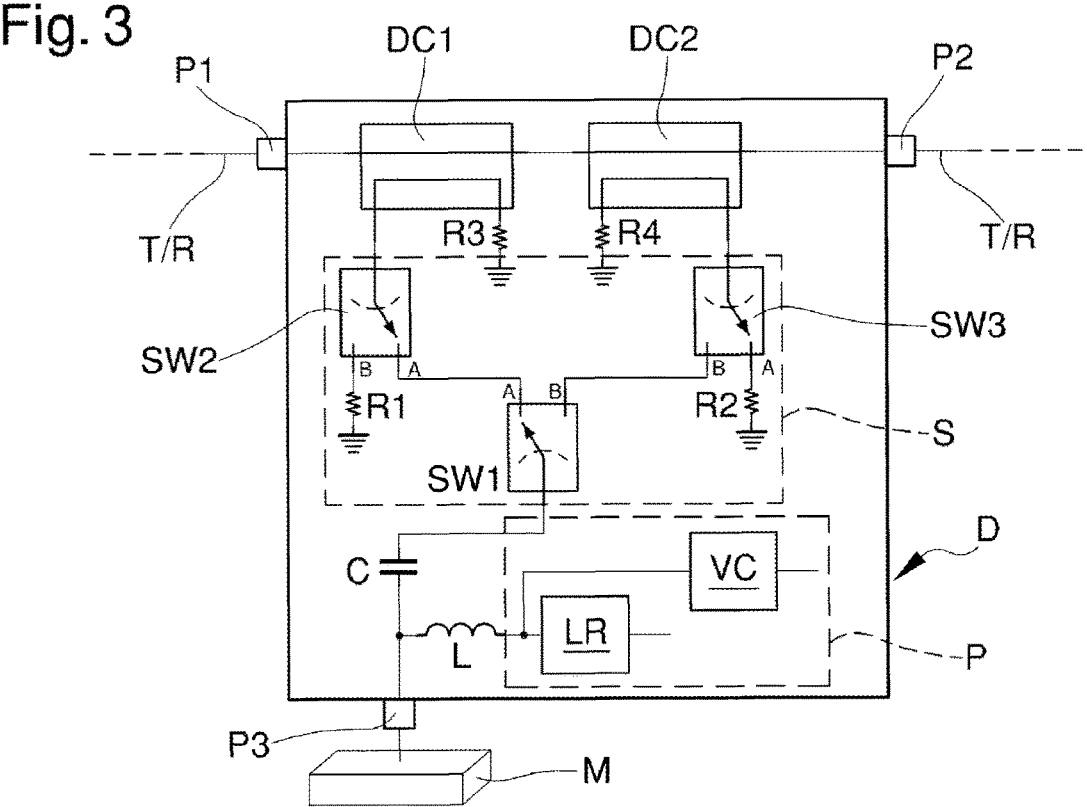
FIG. 3 is a diagram illustrating a second embodiment of the device of the appliance according to the invention in the monitoring configuration.
Figure 4:
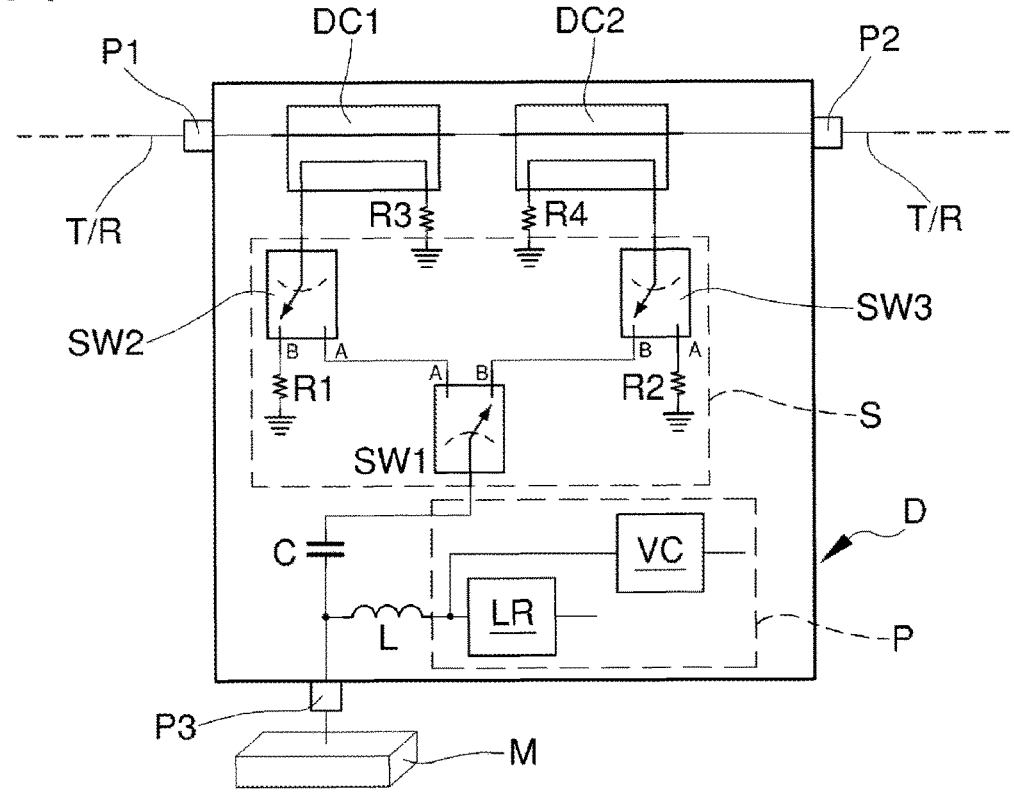
FIG. 4 is a diagram illustrating a second embodiment of the device of the appliance according to the invention in the test configuration.

FIGS. 3 and 4 illustrate a second embodiment of the device D.

In this second embodiment the device D comprises a first coupling device DC1 and a second coupling device DC2 arranged in series together, placed between the first port P1 and the second port P2 and connected to the third port P3 by interposition of the switching circuit S.

In particular, the first coupling device DC1 is able to take in part the signals from the first port P1 and directed to the second port P2 and send them to the third port P3 for the analysis by means of the monitoring appliance M.

The second coupling device DC2 is able to allow the passage of the signals from the first port P1 to the second port P2 when the device D is operating in the monitoring configuration or to take and send the test signal from the third port P3 to the second port P2 when the device D is operating in the test configuration.

In particular, the first coupling device DC1 and the second coupling device DC2 are made up of respective directional couplers.

Preferably, the first coupling device DC is made up of a 30 dB directional coupler, while the second coupling device DC2 is made up of a 10 dB directional coupler.

Advantageously, the switching circuit S comprises a first switching device SW1 connected to the third port P3.

In the monitoring configuration, the first switching device SW1 is switched to a first position, indicated by reference A in the figures, and is connected to a second switching device SW2 of the switching circuit S, connected in turn to the first directional coupler DC1.

In the test configuration, the first switching device SW1 is switched to a second position, indicated by reference B in the figures, and is connected to a third switching device SW3 of the switching circuit S, connected in turn to the second directional coupler DC2.

Moreover, in the monitoring configuration, the second switching device SW2 is positioned in a first position A and is connected to the first switching device SW1.

In the test configuration, the second switching device SW2 is positioned in a second position B and is connected to a first load resistor R1.

With reference to the third switching device SW3, in the monitoring configuration this is positioned in a first position A and is connected to a second load resistor R2.

In the test configuration, the third switching device SW3 is positioned in a second position B and is connected to the first switching device SW1.

Advantageously, again referring to the second embodiment of the device D illustrated in FIGS. 3 and 4, the first, second and third switching devices SW1, SW2 and SW3 are respectively made up of a first, second and third RF switches.

The use of RF switches particularly allows for the miniaturisation of the device D.

To avoid the use of direct power lines, the present invention provides direct current power supply through the same RF cable connected to the port P3.

In particular, the appliance M itself may, using a bias-tee, inject both the direct current power and the RF signal (when using the device in the test configuration) on the same cable connected to the port P3.

Therefore, inside the cable connected to the port P3 are carried both the RF signals which can be switched in receipt and transmission within the appliance M, and the direct current power and control voltage again injected by the appliance M.

Moreover, the piloting circuit P of the device D consists of a voltage comparator VC with an input connected to the third port P3 and an output connected to the first, second and third switches SW1, SW2 and SW3, able to pilot the switching between the monitoring configuration and the test configuration.

In particular, the voltage comparator VC is able to compare the voltage value VP3 measured on the third port P3 with predefined threshold values Vx and Vy, where Vy=Vx+Vz, to pilot the switching of the switches.

The device D also comprises a voltage regulator LR connected to the third port P3 and used to convert the input direct voltage to a constant voltage preferably of 2.5 V, in order to ensure the correct power supply to the switches SW1, SW2 and SW3.

The device D also comprises a capacitor C placed between the third port P3 and the first switch SW1 and has an inductance L between the third port P3 and the piloting circuit P to decouple the direct current power from the radiofrequency signal.

Finally, the device D comprises further load resistors R3 and R4 connected to respective ports of the first directional coupler DC1 and of the second directional coupler DC2 used to appropriately terminate the two directional couplers.

The operation of the device D according to the embodiment illustrated in FIGS. 3 and 4 is described below.

When the voltage comparator VC detects an input voltage on the third port P3 substantially equal to a predefined reference voltage Vx, then the first, second and third switches SW1, SW2 and SW3 are piloted in the monitoring configuration (position A, illustrated in FIG. 3).

In this configuration the device D works as a coupler.

In practice (referring e.g. to the Down-Link of radiofrequency signals) the signal on the first port P1 follows the path to the second port P2, through the first and second directional couplers DC1 and DC2, while a small part of the signal is taken by the first directional coupler DC1 and sent to third port P3.

The signal taken this way can therefore be monitored and analysed by the monitoring appliance M connected to the third port P3.

When, on the other hand, the voltage comparator VC detects an input voltage on the third port P3 substantially equal to a predefined reference voltage Vy, where Vy=Vx+Vz, then the first, second and third switches SW1, SW2 and SW3 are piloted in the test configuration (position B, illustrated in FIG. 4).

In this configuration the device D works as a signal injector.

In practice the test signal from the monitoring appliance M through the third port P3 follows the path to the second port P2, through the second directional coupler DC2. This test signal is therefore transmitted by the external wireless communication system and is used to check the performance of the system itself in terms of the spectrum of the corresponding radiofrequency signal received.

Figure 5:
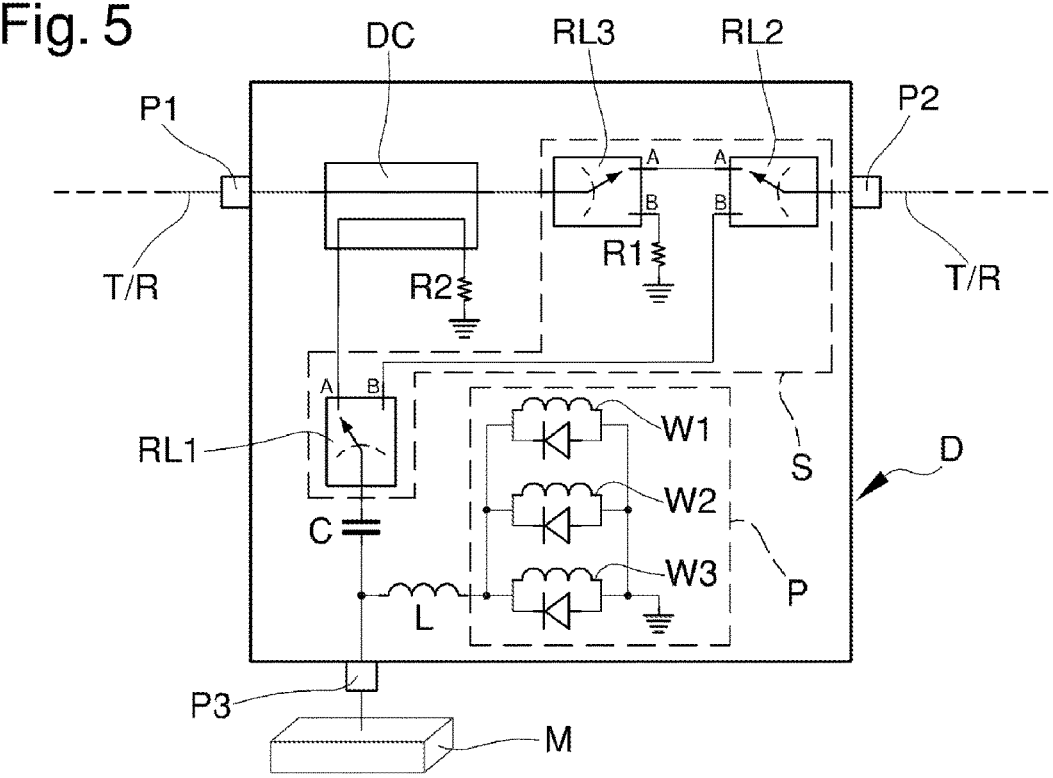
FIG. 5 is a diagram illustrating a third embodiment of the device of the appliance according to the invention in the monitoring configuration.
Figure 6:
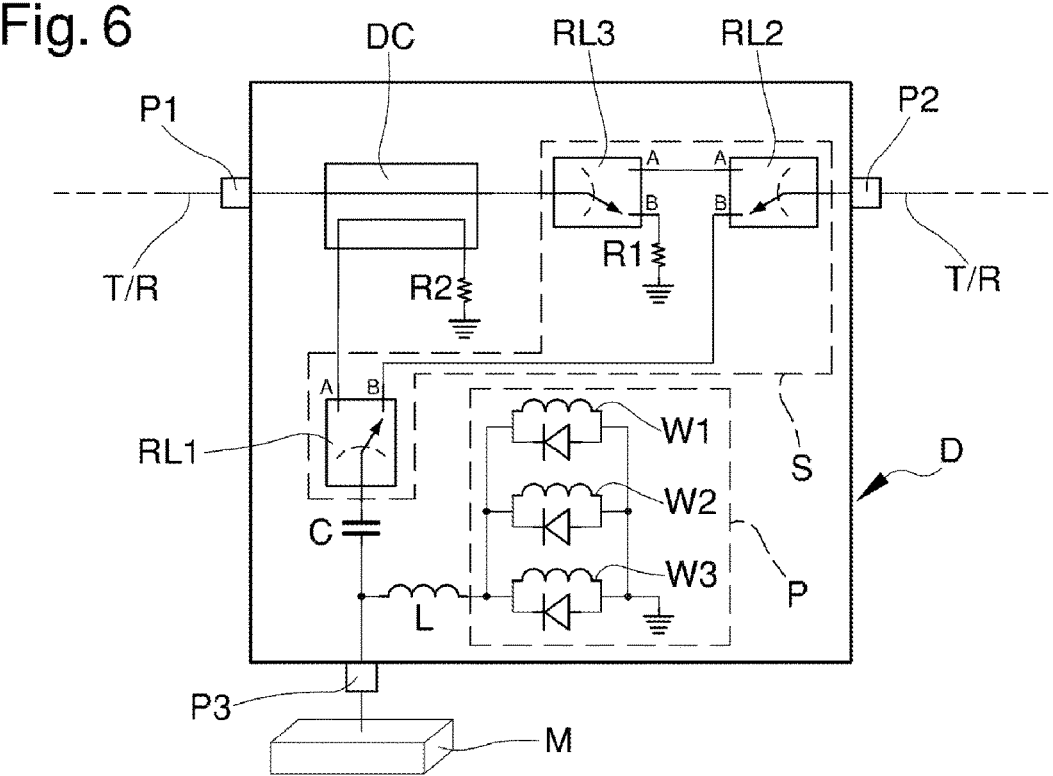
FIG. 6 is a diagram illustrating a third embodiment of the device of the appliance according to the invention in the test configuration.

FIGS. 5 and 6 illustrate a third embodiment of the device D.

According to this third embodiment the device D comprises at least a signal coupling device DC, placed between the first port P1 and the second port P2 and connected to the third port P3.

In particular, the coupling device DC is made up of a directional coupler able to take part of the radiofrequency signals in Up-Link or in Down-Link and send them to the third port P3, for the analysis by means of the monitoring appliance M.

Preferably, the coupling device DC consists of a 30 dB directional coupler.

Advantageously, the switching circuit S comprises a first switching device RL1 connected to the third port P3.

In the monitoring configuration, the first switching device RL1 is switched to a first position, indicated by reference A in the figures, and is connected to the directional coupler DC.

In the test configuration, the first switching device RL1 is switched to a second position, indicated by reference B in the figures, and is connected to a second switching device RL2 of the switching circuit S, connected in turn to the second port P2.

In the monitoring configuration, the second switching device RL2 is switched to a first position A and is connected to a third switching device SW3 of the switching circuit S, connected in turn to the directional coupler DC.

In the test configuration, the second switching device RL2 is switched to a second position B and is connected to the first switching device RL1.

Moreover, in the monitoring configuration, the third switching device RL3 is switched to a first position A and is connected to the second switching device RL2.

In the test configuration, the third switching device RL3 is switched to a second position B and is connected to a load resistor R1.

Usefully, the presence of the resistor R1, preferably equal to 50 ohm, on port B of the third switching device RL3 allows to terminate the transmission line connected to the first port P1, minimising the Voltage Standing Wave Ratio VSWR when the second and third switching devices RL2 and RL3 are in the test configuration (position B).

Advantageously, again referring to the third embodiment of the device D illustrated in FIGS. 5 and 6, the first, second and third switching devices RL1, RL2 and RL3 are composed of a first, second and third relay respectively.

The use of the relay particularly allows for the use of multiple relay modules which are easily incorporated into the device.

Moreover, if there is no power, the signals from the first port P1 can in any case reach the second port P2, or vice versa.

The piloting circuit P of the device D consists of windings W1, W2, W3 of the relays themselves, connected to the third port P3.

The device D also comprises a capacitor C placed between the third port P3 and the first switch RL1 and has an inductance L between the third port P3 and the piloting circuit P to decouple the direct current power from the radiofrequency signal.

Finally, the device D comprises a further load resistor R2 connected to one of the ports on the coupling device DC used to appropriately terminate the latter.

The operation of the device D according to the third embodiment illustrated in FIGS. 5 and 6 is described below.

When there is no voltage on the third port P3, no voltage is generated on the heads of the windings W1, W2 and W3 of the first, second and third relays RL1, RL2 and RL3, which are therefore positioned in the monitoring configuration (position A, illustrated in FIG. 5).

In this configuration the device D works as a coupler.

In practice (referring e.g. to the Down-Link of radiofrequency signals) the signal on the first port P1 follows the path to the second port P2, while a small part of the signal is taken by the directional coupler DC and sent to third port P3.

This signal taken this way can therefore be monitored and analysed by the monitoring appliance M connected to the third port P3.

When, on the other hand, there is a voltage other than zero on the third port P3, the windings W1, W2 and W3 switch the first, second and third relays RL1, RL2 and RL3, to the test configuration (position B, illustrated in FIG. 6).

In this configuration the device D works as a signal injector.

In practice the test signal from the monitoring appliance M through the third port P3 follows the path to the second port P2. This test signal is therefore transmitted by means of the external wireless communication system and is used to check the performance of the system itself in terms of the spectrum of the corresponding radiofrequency signal received.

Figure 7:
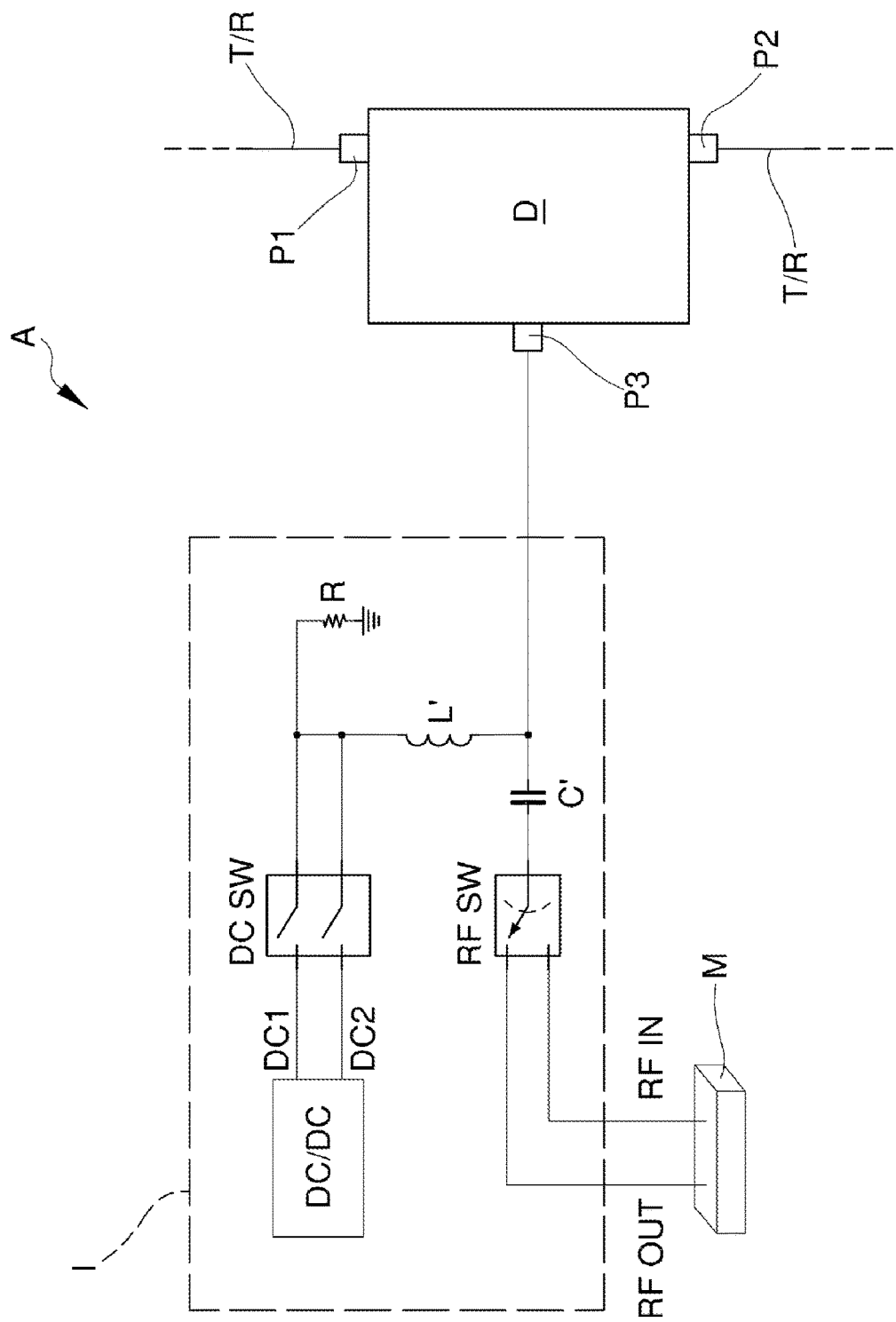
FIG. 7 is a diagram illustrating a possible embodiment of an interfacing unit of the appliance according to the invention.

Advantageously, referring to all above-described embodiments of the device D, the appliance A may include the use of a suitable external interfacing unit I, of the type schematically illustrated in FIG. 7, able to connect the monitoring appliance M to the device D and to supply on the third port P3 both the direct current power and the RF signal through a single RF cable.

In particular, the interfacing unit I comprises a DC/DC generator with a first output DC1 able to supply a first predefined direct voltage and a second output DC2 able to supply a second predefined direct voltage.

For example, when using RF switches inside the device D, as described and illustrated with reference to the first and second embodiments, the first predefined direct voltage may be equal to 3V, while the second predefined direct voltage may be equal to 5V.

Otherwise, when using relays inside the device D, as described and illustrated with reference to the third embodiment, the first predefined direct voltage may be equal to zero, while the second predefined direct voltage may be equal to 5V.

The interfacing unit I comprises a switch DC SW able to connect alternatively the first output DC1 or the second output DC2 to the third port P3, to bring on the third port P3 the first predefined direct voltage or the second predefined direct voltage.

The interfacing unit I also comprises a RF switch SW able to connect alternatively to the third port P3 a relative output port RF OUT of the monitoring unit M, used to inject the test signal, or a relative input port RF IN of the monitoring unit M, used to receive the radiofrequency signals to analyse.

The interfacing unit I also comprises a capacitor C' positioned between the RF switch SW and the third port P3 and an inductance L' positioned between the switch DC SW and the third port P3 to couple the direct current power supply to the radiofrequency signal.

The direct current power supply and the radiofrequency signals are therefore sent through a single cable RF connecting the interfacing unit I and the third port P3.

Finally, the interfacing unit I also comprises a load resistor R connected to the output of the switch DC SW and used to terminate the latter appropriately.

Other embodiments of the interfacing unit I cannot not however be ruled out.

Usefully, the interfacing unit I may also be incorporated within the monitoring appliance M.

It should also be noticed that the interfacing unit I and the device D may be spaced apart, and therefore do not necessarily have to be located.

It has in practice been found how the described invention achieves the proposed objects.

In particular, it is underlined that the device according to the invention allows the use of a single cable to connect the monitoring appliance to the transmission/receiving line of the wireless communication system. This cable can be used in one direction to receive the radiofrequency signals to be monitored and, in the other direction, to send the test signal along the transmission/receiving line.

Moreover, the appliance according to the invention allows to send the direct current power supply and the radiofrequency signals on a single RF cable.

Therefore, the device according to the invention allows to simplify the installation procedures of known monitoring appliances on wireless communication systems and to reduce the overall costs of installation, maintenance and use of the monitoring appliances themselves.

The invention claimed is:

1. An appliance for the switching of radiofrequency signals, comprising:
    at least a first port and a second port connectable along a transmission/receiving line of a radiofrequency communication system;
    at least a third port connectable to a monitoring appliance of radiofrequency signals;
    at least a switching circuit configured to switch between:
        a monitoring configuration, wherein said first port and said second port are connected together for the transmission/receiving of signals along said transmission/receiving line and wherein said signals are in part taken and sent to said third port for analysis by said monitoring appliance; and
        a test configuration, wherein said third port and said second port are connected together for sending at least a predefined test signal from said monitoring appliance to said transmission/receiving line;
    at least a piloting circuit connected to said third port, operatively connected to said switching circuit and able to pilot said switching circuit between said monitoring configuration and said test configuration depending on the value of at least a direct current present on said third port; and
    at least a signal coupling device placed between said first port and said second port and connected to said third port, said signal coupling device being able to take in part said signals and to send them to said third port for the analysis by means of said monitoring appliance,
    wherein said switching circuit comprises at least a first switching device connected to said third port, said first switching device being connected to said coupling device in said monitoring configuration and to said second port in said test configuration,
    wherein said switching circuit comprises at least a second switching device connected to said second port, said second switching device being connected to said first port in said monitoring configuration and to said third port in said test configuration, and
    wherein said switching circuit comprises at least a third switching device placed between said first port and said second switching device, said third switching device being connected to said second switching device in said monitoring configuration and to a load resistor in said test configuration.

2. An appliance for the switching of radiofrequency signals, comprising:
    at least a first port and a second port connectable along a transmission/receiving line of a radiofrequency communication system;
    at least a third port connectable to a monitoring appliance of radiofrequency signals;
    at least a switching circuit configured to switch between:
        a monitoring configuration, wherein said first port and said second port are connected together for the transmission/receiving of signals along said transmission/receiving line and wherein said signals are in part taken and sent to said third port for analysis by said monitoring appliance; and
        a test configuration, wherein said third port and said second port are connected together for sending at least a predefined test signal from said monitoring appliance to said transmission/receiving line; and
    at least a first signal coupling device and at least a second signal coupling device arranged in series together, placed between said first port and said second port and connected to said third port, wherein said first coupling device is able to take in part said signals and send said signals to said third port for the analysis by said monitoring appliance, and wherein said second coupling device allows passage of said signals from the first port to the second port or sending of said test signal coming from the third port to said second port,
    wherein said switching circuit comprises at least a first switching device connected to said third port, said first switching device being connected to said first coupling device in said monitoring configuration and to said second coupling device in said test configuration,
    wherein said switching circuit comprises at least a second switching device connected to said first coupling device, said second switching device being connected to said third port in said monitoring configuration and to a load resistor in said test configuration, and
    wherein said switching circuit comprises at least a third switching device connected to said second coupling device, said third switching device being connected to a load resistor in said monitoring configuration and to said third port in said test configuration.

3. The appliance according to claim 2, wherein at least one between said first switching device, said second switching device and said third switching device comprises at least a RF switch.

4. The appliance according to claim 3, wherein said piloting circuit comprises at least a voltage comparator with an input connected to said third port and at least an output connected to said at least one RF switch, said voltage comparator being able to compare said voltage value measured on the third port with at least a predefined threshold value.

5. The appliance according to claim 1, wherein at least one between said first switching device, said second switching device and said third switching device comprises at least a relay.

6. The appliance according to claim 5, wherein said piloting circuit comprises at least a winding of said at least one relay connected to said third port.

7. The appliance according to claim 1, comprising at least a direct current generator able to generate at least one direct voltage on said third port.

8. The appliance according to claim 7, wherein said generator has a first output able to supply a first predefined direct voltage and a second output able to supply a second predefined direct voltage and by the fact that it comprises at least a switch able to connect alternatively to said third port said first output or said second output, to bring on said third port the first predefined direct voltage or the second predefined direct voltage.

9. The appliance according to claim 1, comprising a switch able to connect alternatively to said third port an output port of said monitoring unit, used for the injection of said test signal, or an input port of said monitoring unit, used for receiving the radiofrequency signals to analyze.

* * * * *